United States Patent
Lehner et al.

(10) Patent No.: US 8,875,100 B2
(45) Date of Patent: Oct. 28, 2014

(54) PATTERN ANALYSIS AND PERFORMANCE ACCOUNTING

(75) Inventors: Randall Lehner, Snoqualmie, WA (US); Nopparut Abhinoraseth, Redmond, WA (US); Pravjit Tiwana, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 13/163,555

(22) Filed: Jun. 17, 2011

(65) Prior Publication Data

US 2012/0324416 A1 Dec. 20, 2012

(51) Int. Cl.
*G06F 9/44* (2006.01)
*G06F 11/36* (2006.01)

(52) U.S. Cl.
CPC .............. *G06F 11/3604* (2013.01); *G06F 8/71* (2013.01); *G06F 11/3616* (2013.01)
USPC ............................ 717/122; 717/120; 717/126

(58) Field of Classification Search
USPC .......... 717/120–167, 168–178; 709/217–224; 714/44–47.2
See application file for complete search history.

(56) References Cited

U.S. PATENT DOCUMENTS

| | | | |
|---|---|---|---|
| 5,168,563 A | 12/1992 | Shenoy et al. | |
| 6,292,940 B1 | 9/2001 | Sato | |
| 6,880,153 B1 * | 4/2005 | Thompson et al. | 717/151 |
| 7,543,284 B2 | 6/2009 | Bolton et al. | |
| 7,861,226 B1 | 12/2010 | Episkopos et al. | |
| 2004/0215755 A1 * | 10/2004 | O'Neill | 709/223 |
| 2005/0044538 A1 | 2/2005 | Mantripragada | |
| 2005/0055673 A1 * | 3/2005 | Dias et al. | 717/127 |
| 2005/0132349 A1 * | 6/2005 | Roberts et al. | 717/168 |
| 2006/0101435 A1 | 5/2006 | Akilov et al. | |
| 2006/0200803 A1 * | 9/2006 | Neumann et al. | 717/120 |
| 2007/0006194 A1 | 1/2007 | Mejri et al. | |
| 2007/0240137 A1 | 10/2007 | Archambault et al. | |
| 2008/0195999 A1 | 8/2008 | Cohen et al. | |
| 2009/0300590 A1 | 12/2009 | Moritz | |
| 2009/0328002 A1 | 12/2009 | Lin et al. | |
| 2010/0042976 A1 | 2/2010 | Hines | |
| 2010/0058294 A1 * | 3/2010 | Best et al. | 717/122 |
| 2010/0162230 A1 * | 6/2010 | Chen et al. | 717/177 |
| 2010/0242034 A1 * | 9/2010 | Rugh et al. | 717/172 |
| 2011/0106496 A1 * | 5/2011 | Napolin et al. | 702/182 |

FOREIGN PATENT DOCUMENTS

KR 10-1999-0048441 B1 6/2001

OTHER PUBLICATIONS

Authors et. al.: IBM, An IP.com Prior Art Database Technical Disclosure, Dec. 13, 2007, pp. 1-19.*
Zhu et al., Implementation, Installation, and Migration, ibm.com/redbooks, Aug. 2005, pp. 1-440.*
Authors et. al.: SPI DST, Dictionaries, Repositories, and All That Jazz, An IP.com Prior Art Database Technical Disclosure, Mar. 30, 2007, pp. 1-103.*

(Continued)

*Primary Examiner* — Satish Rampuria
(74) *Attorney, Agent, or Firm* — Louise Bowman; Jim Ross; Micky Minhas

(57) ABSTRACT

A performance accounting framework may be provided. Upon receiving a section of source code associated with an application, an evaluation may be performed on the section of source code. A performance metric may be calculated according to the at least one evaluation and a report of the calculated performance metric may be provided.

19 Claims, 4 Drawing Sheets

(56) References Cited

OTHER PUBLICATIONS

Bernstein, Philip A., and Umeshwar Dayal. "An overview of repository technology." VLDB. vol. 94. 1994, pp. 705-713.*

Kamita, Takeshi, et al. "A database architecture and version control for group work." System Sciences, 1994. Proceedings of the Twenty-Seventh Hawaii International Conference on. vol. 3. IEEE, 1994, pp. 438-447.*

Bicarregui et al., Ralph. "The verified software repository: a step towards the verifying compiler" Formal Aspects of Computing (2006) 18, pp. 143-151.*

Preissl, et al, Abstract entitled, "Detecting Patterns in MPI Communication Traces," presented at the 2008 IEEE Computer Society, 37th International Conference on Parallel Processing—Published Sep. 9-12, 2008, pp. 230-237; 8 pgs.

Rim Chaabane, Abstract entitled "Poor Performing Patterns of Code: Analysis and Detection," presented at the 2007 IEEE ICSM Conference—Published Oct. 2-5, 2007, pp. 501-502; 2 pgs.

International Search Report and Written Opinion mailed Jan. 30, 2013 in PCT/US2012/042249, 10 pages.

* cited by examiner

PATTERN ANALYSIS AND PERFORMANCE ACCOUNTING

BACKGROUND

Pattern analysis and performance accounting for agile code development may be provided. Conventional large scale, highly used service development often faces the challenge of decreasing errors and increasing the speed of code flow from developer to production. Traditional testing approaches identify the performance of new code pieces or components by relying on heavy infrastructures where suites of tests are run to identify performance regressions. In some situations, the time from when the code is checked in by a developer to the time tests are run may be pretty significant. Conventional test methodologies also do not provide instant feedback to the developer as to whether the code will use less or more resources (e.g., processor usage, disk operations, memory, network, etc.) and/or if performance in terms of latencies or execution times will improve or deteriorate.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A performance accounting framework may be provided. Upon receiving a section of source code associated with an application, an evaluation may be performed on the section of source code. A performance metric may be calculated according to the at least one evaluation and a report of the calculated performance metric may be provided.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
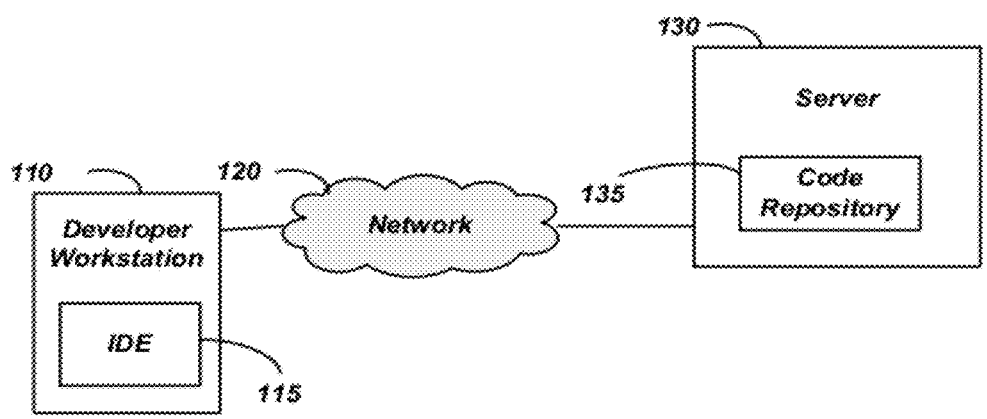
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A framework may be provided that comprises a large number of methods and algorithms for pattern recognition and performance accounting. This may allow for performance regression before code has been checked into a build tree. Static analysis may spot performance issues at compile time (i.e., in the source code), rather than at runtime as with conventional test methodologies. For example, evaluating all code branches and counting specific call types, such as remote procedure calls (RPCs), and/or identifying inefficient patterns (e.g., unnecessary allocated strings, excessive use of delegates, objects not disposed of properly, dead variables, etc.). This may provide a black and white analysis of the code performance and also check against any previous regression patterns instantaneously. This performance framework may capture the usual suspects like resource cleanup, exceptions, string management, threading, boxing, etc., but may also perform enumerative accounting of hardware resource utilization along with call loads.

FIG. 1 is a block diagram of an operating environment 100 comprising a developer workstation 110 operative to execute an integrated development environment (IDE) 115. Developer workstation 110 may be coupled, via a network 120 for example, to a server 130. Server 130 may be operative to execute a code repository 135. IDE 115 may comprise a software application that provides comprehensive facilities to computer programmers for software development, such as a source code editor, a debugger, and/or a compiler/interpreter (e.g., Microsoft® Visual Studio). Code repository 135 may comprise a revision control system for managing and maintaining source code associated with a development project.

Figure 2:
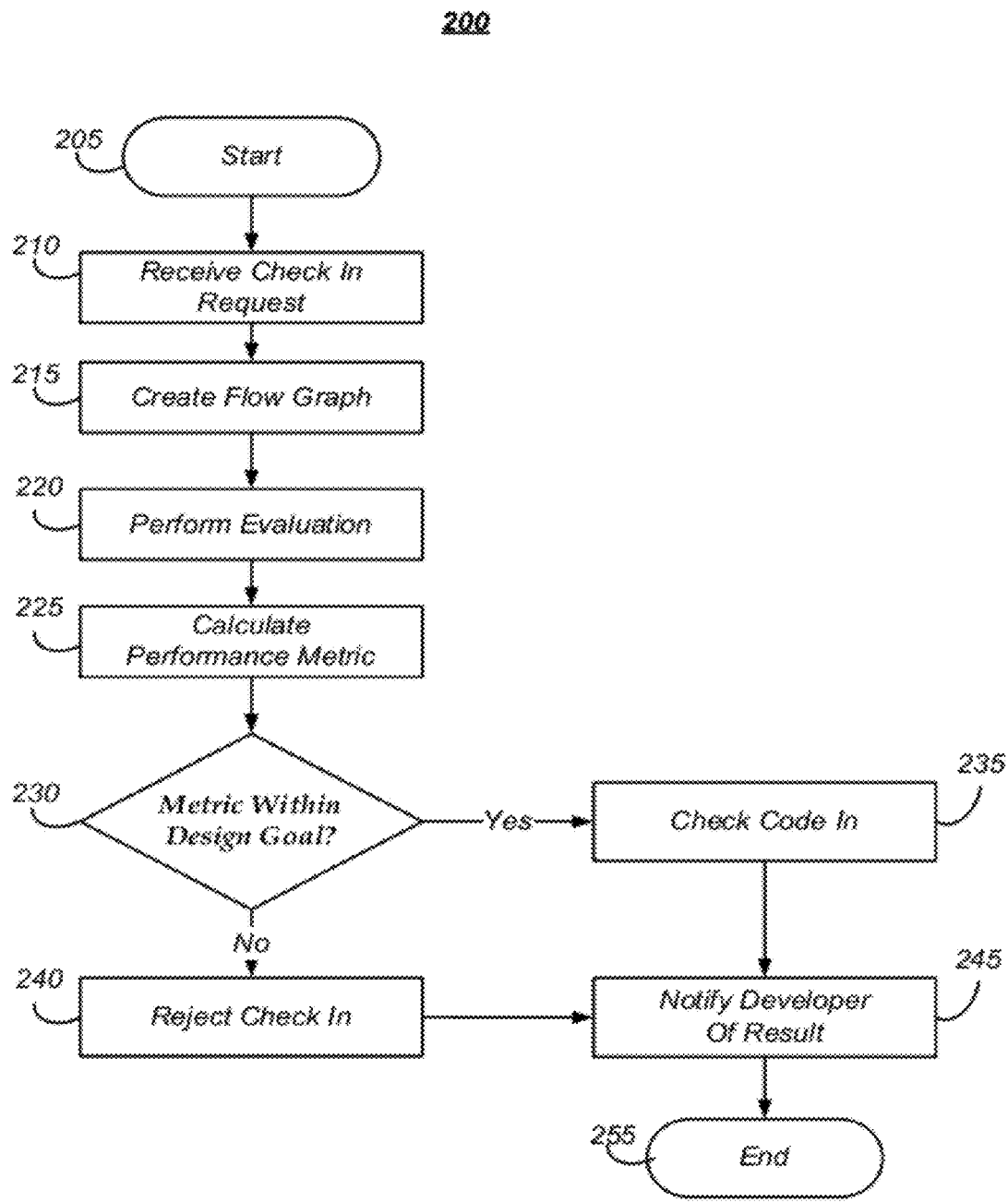
FIG. 2 is a flow chart of a method for providing command execution approval.

FIG. 2 is a flow chart setting forth the general stages involved in a method 200 consistent with an embodiment of the invention for providing a performance accounting framework. Method 200 may be implemented using a computing device 400 as described in more detail below with respect to FIG. 3. Ways to implement the stages of method 200 will be described in greater detail below. Method 200 may begin at starting block 205 and proceed to stage 210 where computing device 400 may receive a request to evaluate a section of source code. For example, a developer may request that the source code be checked into code repository 135. The section of source code may be identified via annotations and/or comments within the source code. For example, the start of a function may be marked with a [START] annotation. Such annotations may, for example, use the C# language's built in attribute notation. Such annotations may also be used to state project design goals (e.g., no more than 15 MB of memory in use) and/or impose requirements on a block of code (e.g., no network operations).

Method 200 may advance to stage 215 where computing device 400 may create a flow graph associated with the section of source code. For example, computing device 115 may evaluate the code and build a map of the various execution paths. Each of the plurality of execution paths may be associated with a weighting defined within the section of source code. For example, the weighting may be associated with the percentage of times a given path is expected to be followed as defined by the developer and/or derived from usage patterns analyzed at run time. Method 200 may advance to stage 220 where computing device 400 may perform at least one evaluation of the section of source code according to the flow graph. For example, computing device 400 may evaluate a count of CPU operations, memory usage, network usage, proper object management, remote procedure calls, etc. A definition of the evaluation to be performed may be included in the source code by an annotation such as [CPU OPS] to define a test for the number of CPU operations within the section of source code. The evaluation may capture common development issues such as resource cleanup, exceptions, string management, and multi-threading as well as enumerative accounting of hardware resource utilization and call loads.

Method 200 may advance to stage 225 where computing device 400 may calculating a performance metric according to the at least one evaluation. For example, the performance metric may comprise a spread calculation that may calculate an average between a maximum, worst case execution path and a minimum or minimum+1 execution path. The minimum+1 path may comprise a next to least calculation. For example, one execution path of a function where the evaluation is looking for remote procedure calls (RPCs) may result in an error check causing a return from the function before any RPCs are performed. The minimum+1 calculation may ignore this path for the next lowest RPC count. The spread operation may then average, with or without weighting criteria factored in, the minimum+1 and maximum, worst case execution paths.

Method 200 may advance to stage 230 where computing device 400 may determine whether the performance metric is within a defined project design goal. For example, a design goal may be defined in an annotation within the source code as allowing no more than a 5% increase in RPCs between code revisions.

If computing device 400 determines that the performance metric is within the defined project design goal, method 200 may advance to stage 235 where computing device 400 may check the code into the repository. Otherwise, if computing device 400 determines that the performance metric is within the defined project design goal, method 200 may advance to stage 235 where computing device 400 may reject the request to check the code into the repository. For example, if the calculated performance metric is less than had been calculated for a previous version of the score, or if the metric is a threshold amount worse, the check in request may be rejected.

Method 200 may then advance to stage 245 where computing device 400 may provide a report to the developer of the calculated performance metric. This report may inform the developer as to the result of the check in request and whether or not the source code satisfied the relevant project design goals. Consistent with embodiments of the invention, project managers and/or quality assurance engineers may also be notified of the results of the evaluation and metric calculations. Computing device 400 may also be operative to determine whether any changes in annotated requirements and/or design goals were made by the developer. Such changes may result in a rejection of the changes and a notification to a project manager. Method 200 may then end at stage 255.

Figure 3:
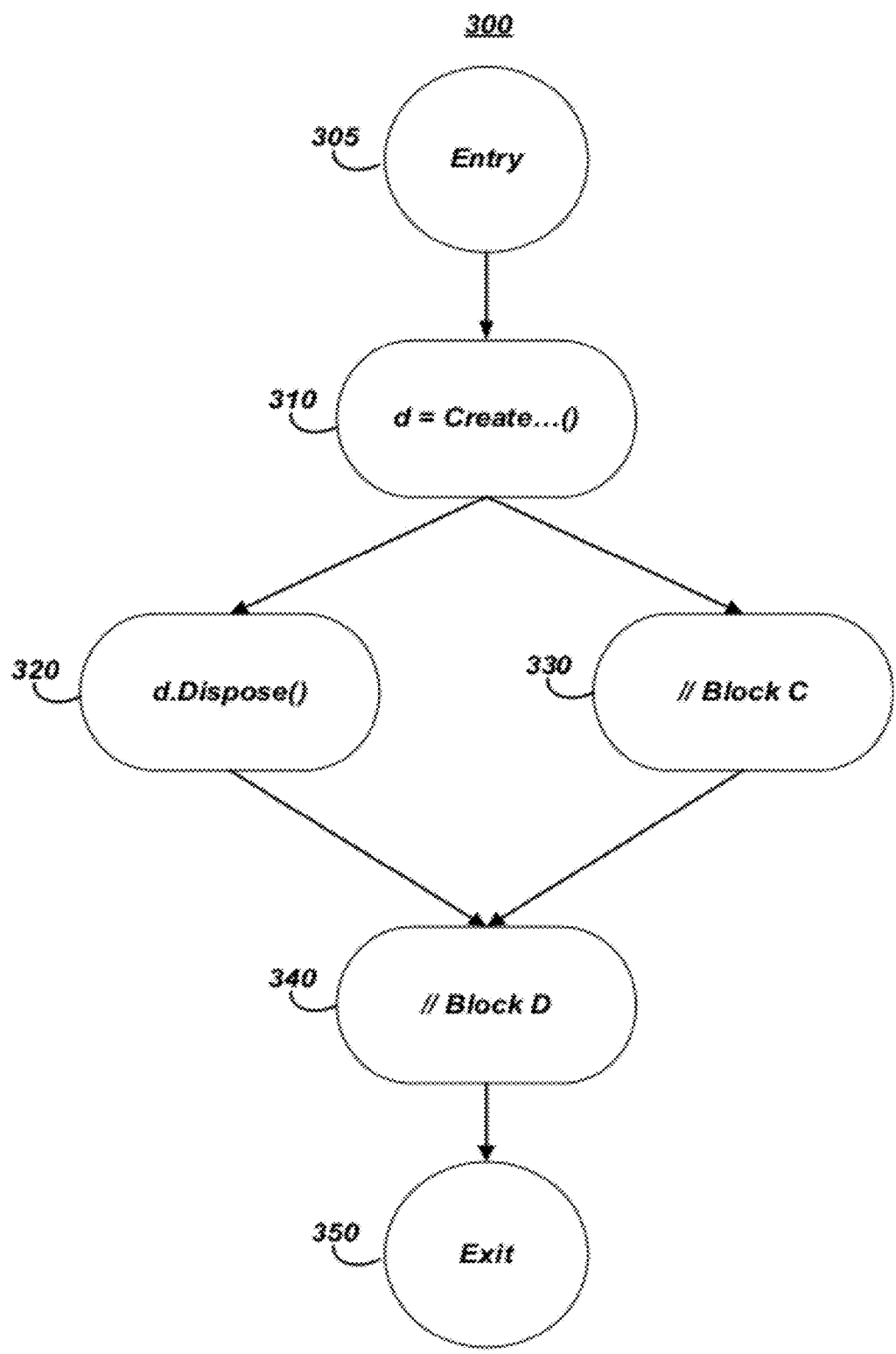
FIG. 3 is a block diagram of an example flow diagram.

FIG. 3 is a block diagram of a flow graph 300. Flow graph 300 may comprise an entry point 305. For example, entry point 305 may be associated with an annotated start point for an evaluation to be run on a subroutine. Flow graph 300 may further comprise an initial step 310, such as the creation of an object. Initial step 310 may lead into a branching execution path to a first path 320 and a second path 330. First path 320 may simply dispose of the object created at initial step 310, such as in response to an error check, while second path 330 may comprise a plurality of execution steps within a code block. First path 320 and second path 330 may converge leading into a final step 340 that may comprise a second plurality of execution steps that may be performed regardless of which execution path is followed. Flow graph 300 may then comprise an exit point 350 whereupon a source code evaluation may be completed and a performance metric may be calculated.

An embodiment consistent with the invention may comprise a system for providing a performance accounting framework. The system may comprise a memory storage and a processing unit coupled to the memory storage. The processing unit may be operative to receive a section of source code associated with an application, perform at least one evaluation on the section of source code, calculate a performance metric according to the at least one evaluation, and provide a report of the calculated performance metric.

Another embodiment consistent with the invention may comprise a system for providing a performance accounting framework. The system may comprise a memory storage and a processing unit coupled to the memory storage. The processing unit may be operative to receive a request to evaluate a section of source code associated with an application, create a flow graph associated with the section of source code, perform at least one evaluation of the section of source code according to the flow graph, calculate a performance metric according to the at least one evaluation, and provide a report of the calculated performance metric.

Yet another embodiment consistent with the invention may comprise a system for providing a performance accounting framework. The system may comprise a memory storage and a processing unit coupled to the memory storage. The processing unit may be operative to receive a request from a developer to evaluate a section of source code associated with an application, create a flow graph associated with the section of source code, perform at least one evaluation of the section of source code according to the flow graph, calculate a performance metric according to the at least one evaluation, and determine whether the performance metric is within a defined project design goal. In response to determining that the performance metric is within the defined project design goal, the processing unit may be operative to check the code into the repository. Otherwise, the processing unit may be operative to reject the request to check the code into the repository. The processing unit may then be operative to provide a report to the developer of the calculated performance metric.

Figure 4:
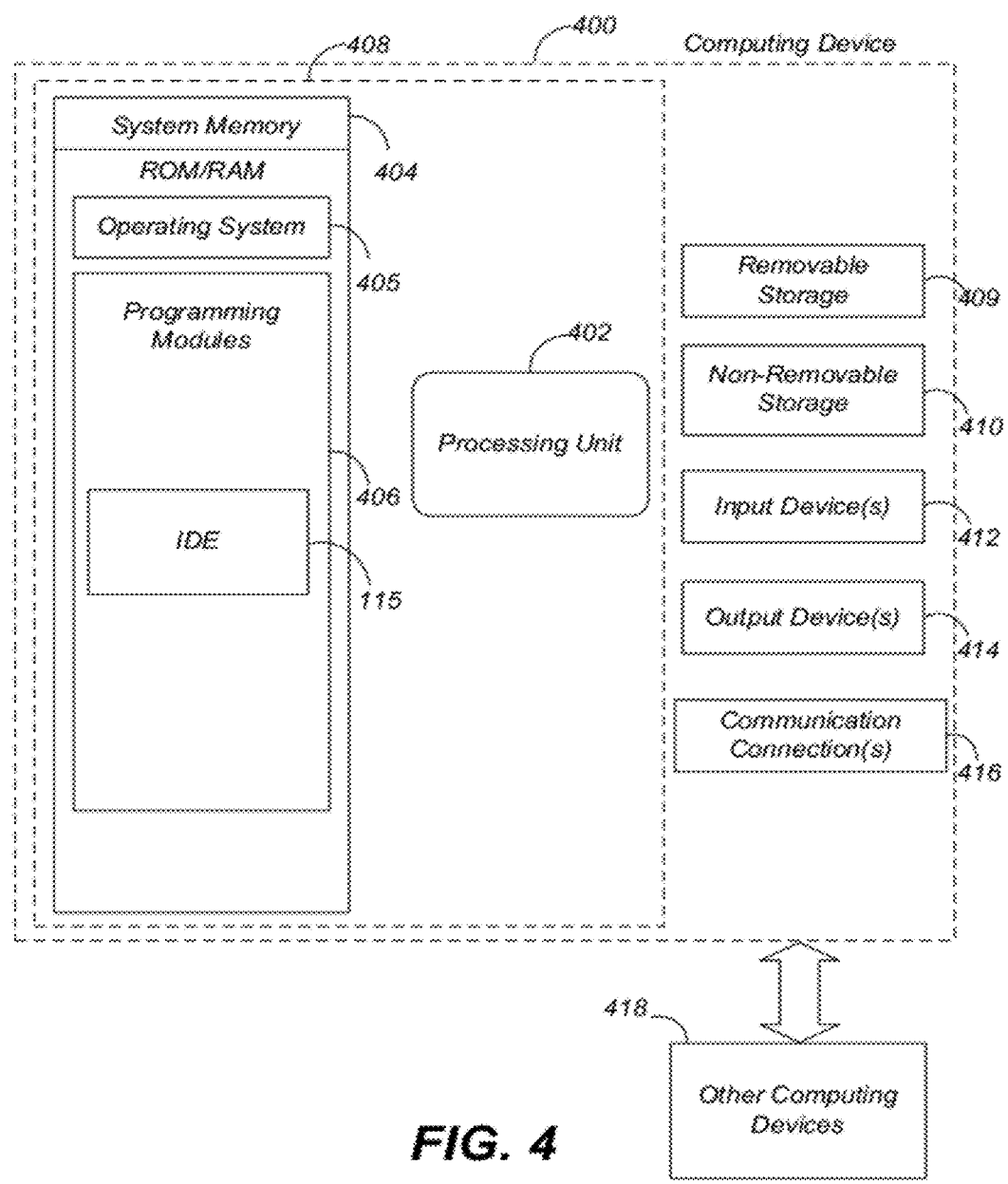
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 100 as described above. Methods described in this specification may operate in other environments and are not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include IDE 115. Operating system 405, for example, may be suitable for controlling computing device 400's operation. In one embodiment, programming modules 406 may include IDE 115 and/or code repository 135. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a performance accounting framework comprising:
   receiving a request to evaluate a section of source code associated with an application for providing the performance accounting framework, wherein the request is associated with a request to check the section of source code into a repository;
   creating a flow graph associated with the section of source code, wherein the flow graph comprises a plurality of execution paths and wherein each of the plurality of execution paths are associated with a weighting defined within the section of source code;
   performing at least one evaluation on the section of source code according to the flow graph;
   calculating by a computing device a performance metric according to the at least one evaluation, the performance metric comprising a spread calculation between a minimum case and a worst case;
   determining whether the performance metric is within a defined project design goal;
   in response to determining that the performance metric is within the defined project design goal, checking the section of the source code into a repository;
   in response to determining that the performance metric is not within the defined project design goal, rejecting the request to check the section of the source code into the repository; and
   providing a report to a developer of the calculated performance metric.

2. The method of claim 1, wherein the section of source code comprises at least one of the following: a file, an object, a plurality of lines of source code, a function, a method, and a library.

3. The method of claim 1, wherein the evaluation is performed in response to a request to check in the section of source code.

4. The method of claim 1, wherein the evaluation is performed in response to a command received from a developer of the section of source code.

5. The method of claim 1, further comprising creating a flow graph associated with the section of source code.

6. The method of claim 5, wherein performing the at least one evaluation of the section of source code comprises performing a data flow analysis of each of a plurality of execution paths defined by the flow graph.

7. The method of claim 6, wherein each of the plurality of execution paths is associated with a weighting criterion to be used in the at least one evaluation of the section of source code.

8. The method of claim 1, wherein the at least one evaluation is defined within the section of source code.

9. The method of claim 8, further comprising:
   determining whether a definition of the at least one evaluation has been modified; and
   in response to determining that the definition of the at least one evaluation has been modified, notifying a project manager.

10. A system for providing a performance accounting framework, the system comprising:
    a memory storage; and
    a processing unit coupled to the memory storage, wherein the processing unit is operative to:
      receive a request to evaluate a section of source code associated with an application for providing the performance accounting framework, wherein the request is associated with a request to check the section of source code into a repository;
      create a flow graph associated with the section of source code, wherein the flow graph comprises a plurality of execution paths and wherein each of the plurality of execution paths are associated with a weighting defined within the section of source code;
      perform at least one evaluation of the section of source code according to the flow graph;
      calculate a performance metric according to the at least one evaluation, the performance metric comprising a spread calculation between a minimum case and a worst case;
      determine whether the performance metric is within a defined project design goal, in response to determining that the performance metric is within the defined project design goal, check the section of the source code into a repository;
      in response to determining that the performance metric is not within the defined project design goal, rejecting the request to check the section of the source code into the repository; and
      provide a report to a developer of the calculated performance metric.

11. The system of claim 10, wherein the performance metric is associated with the project design goal.

12. The system of claim 11, wherein the project design goal is defined by an annotation associated with the section of source code.

13. The system of claim 12, wherein the performance metric further comprises a runtime characteristic of the section of source code.

14. The system of claim 10, wherein the flow graph describes a plurality of possible execution paths for the section of source code.

15. The system of claim 14, wherein the processing unit is further operative to calculate the performance metric according to a weighting criterion associated with each of the plurality of possible execution paths.

16. The system of claim 15, wherein the weighting criterion is defined by a developer in an annotation associated with the section of source code.

17. The system of claim 15, wherein the weighting criterion is defined according to runtime analysis of the section of source code.

18. The system of claim 10, wherein the processing unit is further operative to:
   determine whether the calculated performance metric is worse than at least one previously calculated performance metric associated with the section of source code, and in response to determining that the calculated performance metric is worse than the at least one previously calculated performance metric associated with the section of source code, notify a developer of the section of source code.

19. A computer-readable hardware storage device which stores a set of instructions which when executed performs a method for providing a performance accounting framework, the method executed by the set of instructions comprising:

receiving a request to evaluate a section of source code associated with an application for providing the performance accounting framework, wherein the request is associated with a request to check the section of source code into a repository;

creating a flow graph associated with the section of source code, wherein the flow graph comprises a plurality of execution paths and wherein each of the plurality of execution paths are associated with a weighting defined within the section of source code;

performing at least one evaluation of the section of source code according to the flow graph;

calculating a performance metric according to the at least one evaluation, wherein the performance metric comprises a spread calculation between a minimum case and a worst case;

determining whether the performance metric is within a defined project design goal; in response to determining that the performance metric is within the defined project design goal, checking the section of the source code into the repository;

in response to determining that the performance metric is not within the defined project design goal, rejecting the request to check the section of the source code into the repository; and providing a report to a developer of the calculated performance metric.

* * * * *